(12) United States Patent
Lai et al.

(10) Patent No.: US 10,273,192 B2
(45) Date of Patent: Apr. 30, 2019

(54) PATTERNED ABRADABLE COATING AND METHODS FOR THE MANUFACTURE THEREOF

(71) Applicant: Rolls-Royce Corporation, Indianapolis, IN (US)

(72) Inventors: Benjamin John Bowin Lai, Avon, IN (US); Kang N. Lee, Zionsville, IN (US); David J. Thomas, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 211 days.

(21) Appl. No.: 15/046,240

(22) Filed: Feb. 17, 2016

(65) Prior Publication Data

US 2016/0236995 A1 Aug. 18, 2016

Related U.S. Application Data

(60) Provisional application No. 62/117,269, filed on Feb. 17, 2015.

(51) Int. Cl.
*B32B 3/00* (2006.01)
*C04B 41/91* (2006.01)
(Continued)

(52) U.S. Cl.
CPC ............ *C04B 41/91* (2013.01); *B32B 18/00* (2013.01); *C04B 35/16* (2013.01); *C04B 35/195* (2013.01); *C04B 35/6264* (2013.01); *C04B 35/62218* (2013.01); *C04B 35/6342* (2013.01); *C04B 35/645* (2013.01); *C04B 37/005* (2013.01); *C04B 41/009* (2013.01); *C04B 41/53* (2013.01); *F01D 5/288* (2013.01); *F01D 11/122* (2013.01); *C04B 2235/3213* (2013.01); *C04B 2235/3215* (2013.01); *C04B 2235/3224* (2013.01); *C04B 2235/945* (2013.01); *C04B 2237/062* (2013.01); *C04B 2237/08* (2013.01); *C04B 2237/10* (2013.01); *C04B 2237/16* (2013.01); *C04B 2237/341* (2013.01); *C04B 2237/343* (2013.01); *C04B 2237/36* (2013.01); *C04B 2237/365* (2013.01); *C04B 2237/368* (2013.01);
(Continued)

(58) Field of Classification Search
None
See application file for complete search history.

(56) References Cited

U.S. PATENT DOCUMENTS 4,329,308 A * 5/1982 Langer ............... F01D 11/122
264/293
4,764,089 A 8/1988 Strangman
(Continued)

FOREIGN PATENT DOCUMENTS

EP 1905860 A2 4/2008
EP 2354276 A1 8/2011
WO WO-2011085376 A1 * 7/2011 ............ F01D 11/122

*Primary Examiner* — Seth Dumbris
(74) *Attorney, Agent, or Firm* — Shumaker & Sieffert, P.A.

(57) ABSTRACT

A ceramic article includes a flexible backing selected from paper, woven fabric, non-woven fabric, polymeric films, metal foils, and combinations thereof. A green ceramic layer is on a first side of the flexible backing, wherein the green ceramic layer includes a ceramic material and a polymeric binder. A major surface of the green ceramic layer includes a pattern of features.

17 Claims, 17 Drawing Sheets

(51) Int. Cl.
*C04B 35/16* (2006.01)
*C04B 41/00* (2006.01)
*C04B 41/53* (2006.01)
*B32B 18/00* (2006.01)
*C04B 35/195* (2006.01)
*C04B 35/622* (2006.01)
*C04B 35/626* (2006.01)
*C04B 35/634* (2006.01)
*C04B 35/645* (2006.01)
*C04B 37/00* (2006.01)
*F01D 5/28* (2006.01)
*F01D 11/12* (2006.01)

(52) U.S. Cl.
CPC .... *C04B 2237/38* (2013.01); *C04B 2237/708* (2013.01); *C04B 2237/72* (2013.01); *C04B 2237/86* (2013.01)

(56) References Cited

U.S. PATENT DOCUMENTS

| | | | |
|---|---|---|---|
| 6,457,939 B2 | 10/2002 | Ghasripoor et al. | |
| 6,830,428 B2 | 12/2004 | Le Biez et al. | |
| 6,846,574 B2 | 1/2005 | Subramanian | |
| 6,881,029 B2 | 4/2005 | Le Biez et al. | |
| 7,089,659 B2 * | 8/2006 | Iwaida | B32B 3/30 |
| | | | 156/89.12 |
| 7,247,363 B2 * | 7/2007 | Natarajan | H01L 21/481 |
| | | | 427/97.2 |
| 7,279,241 B2 * | 10/2007 | Ketcham | H01M 8/1226 |
| | | | 429/465 |
| 7,686,990 B2 | 3/2010 | Gray | |
| 7,819,625 B2 * | 10/2010 | Merrill | F01D 11/122 |
| | | | 415/170.1 |
| 8,501,840 B2 | 8/2013 | Kirby et al. | |
| 8,506,243 B2 | 8/2013 | Strock et al. | |
| 2003/0034122 A1 * | 2/2003 | Asai | B24C 1/04 |
| | | | 156/252 |
| 2004/0021256 A1 | 2/2004 | DeGrange et al. | |
| 2005/0095482 A1 * | 5/2005 | Garner | C04B 35/486 |
| | | | 429/482 |
| 2005/0156361 A1 | 7/2005 | Holowczak et al. | |
| 2007/0098987 A1 * | 5/2007 | Huddleston | C22C 19/05 |
| | | | 428/469 |
| 2008/0280101 A1 * | 11/2008 | Morrison | F01D 11/122 |
| | | | 428/141 |
| 2009/0097970 A1 * | 4/2009 | Tholen | F01D 11/122 |
| | | | 428/432 |
| 2009/0256284 A1 | 10/2009 | Maguire et al. | |
| 2010/0080986 A1 * | 4/2010 | Iijima | B32B 18/00 |
| | | | 428/336 |
| 2011/0103940 A1 | 5/2011 | Duval et al. | |
| 2011/0182720 A1 | 7/2011 | Kojima et al. | |
| 2012/0107103 A1 | 5/2012 | Kojima et al. | |
| 2012/0128879 A1 * | 5/2012 | Cybulsky | F01D 11/122 |
| | | | 427/243 |
| 2012/0213659 A1 | 8/2012 | Bayer et al. | |
| 2013/0001837 A1 | 1/2013 | Gohler et al. | |
| 2013/0017072 A1 | 1/2013 | Ali et al. | |
| 2013/0193620 A1 | 8/2013 | Mironets et al. | |
| 2013/0280049 A1 | 10/2013 | Fisk et al. | |
| 2016/0236994 A1 * | 8/2016 | Vetters | F01D 11/122 |

* cited by examiner

PATTERNED ABRADABLE COATING AND METHODS FOR THE MANUFACTURE THEREOF

This application claims the benefit of U.S. Provisional Application No. 62/117,269 filed Feb. 17, 2015, which is incorporated herein by reference in its entirety.

BACKGROUND

Abradable coatings on flowpath surfaces above the moving metal blade tips in a turbine engine can reduce over tip leakage and improve efficiencies. For example, a rotating part can erode a portion of a fixed abradable coating applied on an adjacent stationary part to form a seal having a very close tolerance. In one example application, an abradable seal can be used to minimize the clearance between blade tips and an inner wall of an opposed shroud, which can reduce leakage or guide leakage flow of a working fluid, such as steam or air, across the blade tips, and enhance turbine efficiency.

SUMMARY

As noted above, thermal barrier coat (TBC)/abradable coatings have been developed for traditional metal turbine shroud seals, which are also referred to herein as turbine blade track segments. However, ceramic matric composite (CMC) blade track segments require a ceramic environmental barrier coat (EBC)/TBC/abradable coating so the linear coefficients of thermal expansion ($\alpha$) are better matched with the underlying substrate. During operation, a thermal mismatch results between a hot side of the abradable coating being scrubbed by a hot gas in the gas turbine flowpath and an opposed colder side of the abradable coating against the CMC segment. This thermal mismatch causes strains within the abradable coating as the hot side attempts to expand more than the cold side. High levels of these strains can cause the coating to crack and spall. Spallation can expose the underlying CMC component to excessive temperatures and can hurt turbine performance due to poorer efficiency due to increased tip clearance.

The exceeding low $\alpha$ of the CMC makes it difficult to find an abradable coating with a similar coefficient of thermal expansion. In addition, currently available ceramic coatings are not easy to apply and do not have a suitable balance of properties such as, for example, durability, life, TBC performance, and tip rub performance.

Porosity can be important in a traditional TBC/abradable coating for metal turbine blade track segments. Porosity reduces the thermal conductivity (improves TBC performance), while also improving tip rub performance. Porosity within the coating has traditionally been created while spraying the coating onto the component. However, only minimal levels of porosity can be created in a sprayed-on ceramic abradable coating, and such coatings are heavy, have high thermal conductivity, and poor tip rub performance.

In the present disclosure, a patterned abradable overlay coating can be made by forming a pattern in a surface of a green ceramic layer on a flexible backing. The resulting green ceramic overlay constructions can be applied in layers to a selected region on a surface of a part (CMC or metal) to form a laminate. The part may then be heated to sinter and consolidate the laminate with the surface of the part to form thereon a patterned abradable overlay coating.

In one aspect, the present disclosure is directed to a ceramic article, including a flexible backing selected from paper, woven fabric, non-woven fabric, polymeric films, metal foils, and combinations thereof; and a green ceramic layer on a first side of the flexible backing, wherein the green ceramic layer includes a ceramic material and a polymeric binder, and wherein a major surface of the green ceramic layer includes an arrangement of features.

In another aspect, the present disclosure is directed to a method including machining a pattern into a surface of a green ceramic layer on a flexible backing to form a machined green ceramic article, wherein the green ceramic layer includes a ceramic material dispersed in a polymeric binder matrix; contacting the machined green ceramic article with a surface of a substrate to form a laminate; and applying at least one of heat and pressure to the laminate to adhere the machined green ceramic article to the surface of the substrate.

In another aspect, the present disclosure is directed to a method, including forming a slurry including a ceramic material, a polymeric binder, and at least one solvent; coating the slurry on a flexible backing to form a green ceramic layer with a disperse phase of the ceramic material in a matrix of the polymeric binder; and machining an array of features into a surface of the green ceramic layer to form a machined green ceramic article.

In another aspect, the present disclosure is directed to a stationary turbine engine component located along a gas path, wherein the stationary turbine engine component includes a surface facing an adjacent rotating turbine engine component; and an abradable overlay coating on the surface, wherein the overlay coating includes an array of depressions.

In various embodiments, the ceramic abradable coatings described in this disclosure can have higher effective porosity compared to sprayed-on coatings, which can provide improved abradability. In various embodiments, the ceramic abradable coatings described in this disclosure can have higher density compared to sprayed-on coatings, which can provide improved erosion resistance.

Using spray techniques, it can be difficult to control the variation of porosity throughout the coating, which can lead to reduced minimum strength (less durable/life) and higher minimum thermal conductivity (poorer TBC performance). By forming a pattern into the surface, the variation in porosity can be more precisely controlled, which can result in improved durability/life, and better tip rub performance.

In various embodiments, the present disclosure provides a thicker abradable layer for a CMC component, which can increase the maximum tip rub capability of a blade track segment and can also provide increased thermal isolation (improved TBC performance). Compared to abradable coatings made with spray-coating techniques, the abradable coatings described herein can provide such enhanced properties at lower cost, and resulting parts can require reduced machining time to fit close tolerances.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
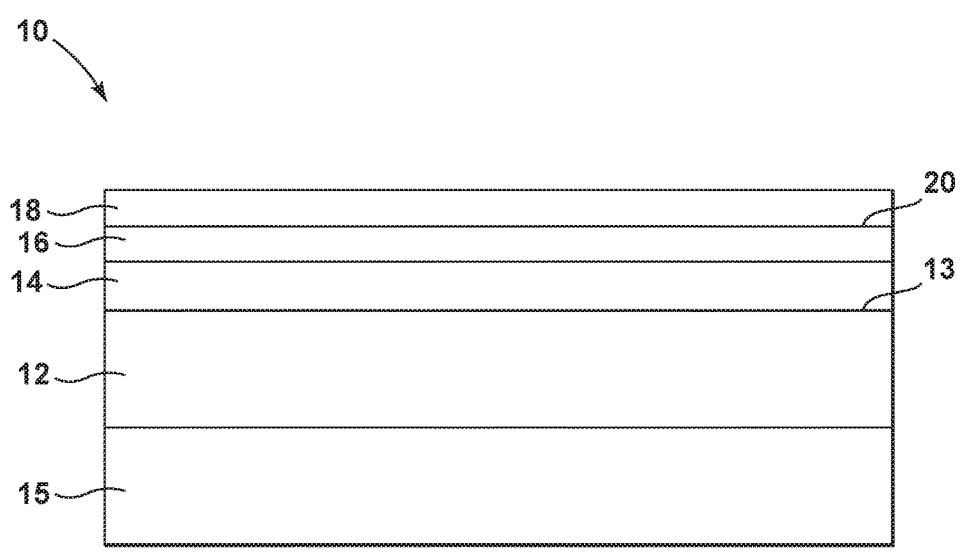
FIG. 1 is schematic, cross-sectional view of a green ceramic article.

FIG. 1 is a schematic diagram of an embodiment of a green ceramic article 10 that can be used to prepare the patterned abradable coatings described in this disclosure, as well as other patterned abradable coatings as described in more detail below. In some embodiments the green ceramic article 10 may form an abradable ceramic overlay that can be applied to a surface of a metal or a CMC substrate. In the embodiment of FIG. 1, the green ceramic article 10 includes a sheet-like backing 12 with a green ceramic layer 14 on a major surface 13 thereof.

In various embodiments, the backing 12 may be selected from any sheet material having suitable dimensional stability, flexibility, solvent resistance, and heat resistance at temperatures required to process the green ceramic layer 14. The surface 13 of the backing 12 is also selected to be compatible with or adhere to the green ceramic layer 14. Suitable materials for the backing 12 include, but are not limited to, sturdy coated or uncoated paper products, woven or non-woven fabrics, polymeric films, metal foils, and the like. For example, suitable polymeric films include, but are not limited to, polyesters poly(ethylene terephthalate), polyimide, polycarbonate, high-density polyethylene (HDPE), polyvinylidene fluoride, polyvinyl chloride (PVC), and nylon. Polyester films such as those available under the trade designation MYLAR from E. I. du Pont de Nemours and Co., Wilmington, Del., have been found to be useful as the backing 12.

In some embodiments a coating such as, for example, a silicone, may be applied to modify the adhesion or release properties of the surface 13. In various embodiments, the surface 13 may be subjected to a treatment such as, for example, patterning, roughening, corona treatment, or the like to modify its surface properties before or after the application of the surface coating.

In some embodiments, the backing 12 may include an optional support layer 15 to provide enhanced stability during processing. The support layer 15 may be selected from coated or uncoated paper, woven or non-woven fabrics, polymeric films, metal foils, and the like.

In this application the term flexible backing refers to materials that are sufficiently thin and compliant to bend and/or twist without breaking or cracking sufficiently to cause damage to the overlying green ceramic layer 14. In some embodiments, the backings 12 are sufficiently flexible to be rolled on themselves without breaking or cracking.

The green ceramic layer 14 on the green ceramic article 10 includes a ceramic material and an adhesive binder. In various embodiments, the particles in the green ceramic layer 14 include aluminum nitride, aluminum diboride, boron carbide, aluminum oxide, mullite, zirconium oxide, carbon, silicon carbide, silicon nitride, transition metal nitrides, transition metal borides, rare earth (RE) oxides, and mixtures and combinations thereof. In some embodiments, the ceramic layer 14 includes at least one silicate, which in this application refers to a synthetic or naturally-occurring compound including silicon and oxygen. Suitable silicates include, but are not limited to, rare earth (RE) disilicates, RE monosilicates, barium strontium aluminum silicate, and mixtures and combinations thereof.

The sizes and shapes of the ceramic materials in the ceramic layer 14 may vary widely, and in various embodiments the silicate materials may have a wide variety of regular or irregular shapes including, for example, spheres, rods, disks, and the like.

The green ceramic layer 14 further includes an adhesive binder that forms a matrix about the disperse phase of the ceramic materials. The binder can include any adhesive compound or mixture of compounds that forms or is capable of forming a flexible network to effectively retain the silicate materials in the green layer as the green ceramic layer is subsequently machined and processed. While not wishing to be bound by any theory, presently available evidence indicates that the binder materials form a network of flexible bridges or crosslinks between the ceramic materials, which provides the green ceramic layer 14 with excellent flexibility and porosity.

Suitable binders also include, but are not limited to, polymeric materials such polyvinyl butyral (PVB), and suitable PVB resins may be obtained under the trade designation BUTVAR from Eastman Chemical Co., Kingsport, Tenn.

In another embodiment, the green ceramic layer 14 includes one or more monomers which, when polymerized, form a matrix or crosslinked polymerized network about the ceramic materials. In various embodiments, the monomeric binder material may include, but are not limited to, acrylamides, acrylates, vinyls, allyls, and mixtures and combinations thereof. The binder monomers may optionally include one, two, or more functional groups such as, for example, (meth)acryl, acrylamido, vinyl, allyl, and the like.

In some embodiments, the green ceramic layer 14 can include an optional polymerization initiator to aid crosslinking of the monomeric binder materials. The polymerization initiator may vary widely depending on the selected monomeric binders, and in various example embodiments may include a peroxide, a persulfate, a perchlorate, an amine, an azo compound, and mixtures and combinations thereof.

In various embodiments, the green ceramic layer 14 may optionally include additives such as, for example, plasticizers, dispersants, surfactants, release agents, and the like to modify its properties for a particular application. Suitable plasticizers include, but are not limited to, those available under the trade designation SANTICIZER 160 from Ferro Corp., Walton Hills, Ohio, polyethylene glycol (PEG) available from Sigma Aldrich Corp., St. Louis, Mo., and mixtures and combinations thereof. Suitable dispersants include, but are not limited to, those available under the trade designation DISPERBYK from Byk USA, Wallingford, Conn., such as DISPERBYK 110.

The green ceramic layer 14 may also optionally include a carrier liquid selected to disperse and/or dissolve the ceramic particles, binders, and other additives. In various embodiments, the carrier liquid is aqueous (includes a major amount of water), or is water. Other carrier liquids that can be used in green ceramic layer 14 include, but are not limited to, organic compounds such as alcohols (for example n-butyl alcohol and ethyl alcohol), acetone, diacetone alcohol, methyl ethyl ketone (MEK), xylene, toluene, and mixtures and combinations thereof.

For example, in some embodiments the carrier liquid is a mixture of solvents having a wide range of molecular weights. The higher molecular weight solvents remain at or near an upper surface 20 of the layer 14 during drying steps, which can keep the upper surface 20 moist during subsequent processing. The moistened ceramic layer 14 can more effectively reduce or even prevent cracking and delamination during subsequent processing steps. For example, a mixture of solvents such as, about 60% MEK, about 35% ethanol has be found to be effective in reducing cracking of the green ceramic layer 14 during subsequent processing.

Referring again to FIG. 2, the ceramic article 10 may further optionally include a release liner 18, which can protect the surface 20 of the green ceramic layer 14 until the layer 14 is heated, machined or otherwise processed, or as the article 10 is rolled on itself or stacked with other tape constructions. Suitable release liners include a paper or plastic film having a silicone release surface or a low surface energy polymeric film containing no silicone. Suitable non-silicone containing release liners include for example fluoropolymer based release liners or polyolefins.

The ceramic layer 14 of the article 10 is formed from a slurry including the components set forth above: ceramic particles, a binder material, optional additives, and a solvent or carrier liquid. The ceramic particles may optionally be milled to ensure that the particles are dispersed and have an appropriate shape and size. Properties of the slurry such as, for example, pH, temperature, and the like may optionally be adjusted before, during, or after the milling process.

The slurry may be applied to a backing material using any suitable coating method to form the green ceramic layer, including, but not limited to slot coating, roll coating, Mayer rod coating, dip coating, curtain coating, slide coating, knife coating, gravure coating, notch bar coating, spraying and the like. In one embodiment, the slurry may be applied to a backing material and treated with a doctor blade to form a smooth surface suitable for subsequent machining steps. In other embodiments, the slurry may be non-continuously deposited on the backing using a printing technique such as, for example, gravure, flexographic, screen, letterpress, ink-jet printing, and the like.

The coating step can be performed either as a roll-to-roll process or in a piece-part fashion.

Following the deposition step, in some embodiments the carrier liquid in the slurry is optionally removed by evaporation to at least partially dry the ceramic-containing layer prior to machining to form a finished green ceramic layer. In various embodiments, the evaporation step may be performed by placing the article in a vented area with circulating room-temperature air, or may optionally be accelerated by heating (e.g., using a dryer). The drying rate should be carefully controlled to prevent cracking and delamination for the green ceramic layer from the backing.

Figure 2:
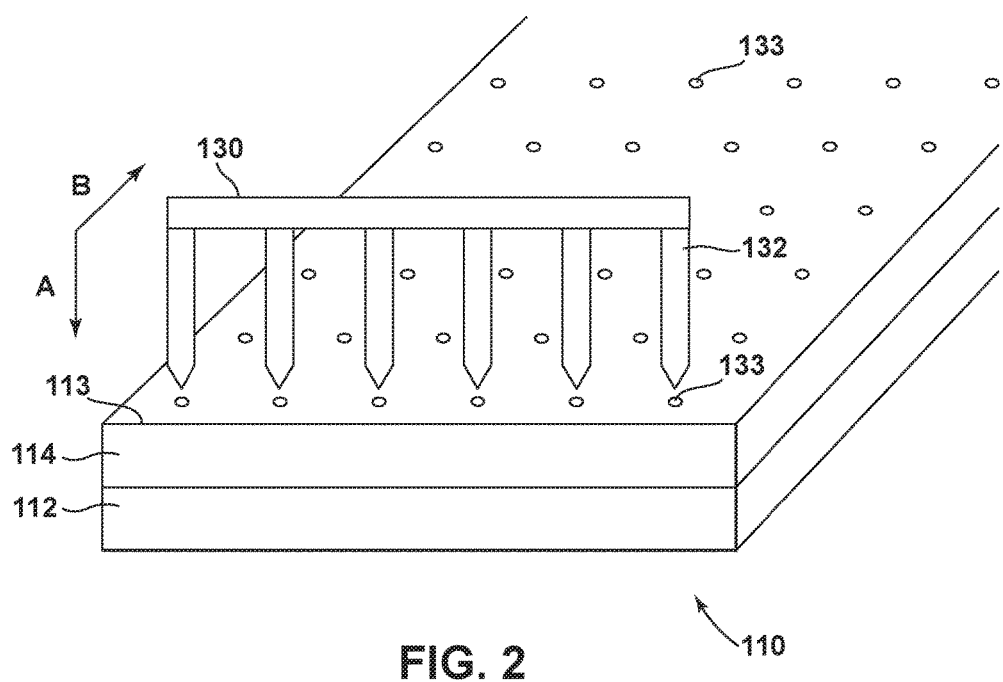
FIG. 2 is a schematic cross-sectional view of a tool used to create a pattern in a surface of a green ceramic article.

Referring now to FIG. 2, in one embodiment the surface 113 of the green ceramic layer 114 on the backing 112 of the green ceramic article 110 can be machined by contacting the ceramic layer 114 with a tool 130. In the schematic example of FIG. 3, the tool 130 includes punch elements 132 that, when moved in the direction of the arrow A, could create, for example, a regular or an irregular array of apertures 133 in all or a portion of the surface 113. The punch elements 132 may be configured to create apertures 133 with a wide variety of shapes, depths and patterns when observed from above including, for example, circles, squares, diamonds, triangles, trapezoids, and combinations thereof. The apertures 133 may also have a wide variety of cross-sectional shapes including, for example, circles, parabolas, triangles, squares, and combinations thereof.

In various exemplary embodiments, the apertures 133 can be shaped like hemispheres, cones, pyramids, and combinations thereof. In some embodiments, these arrays of apertures can minimize thermal stresses and stress concentrations in all or a portion of the surface 113. Other non-mechanical techniques may be used to make the array of apertures 113 in the green ceramic layer 114 including, for example, laser drilling or cutting, or chemical etching through a mask.

Figure 3A:
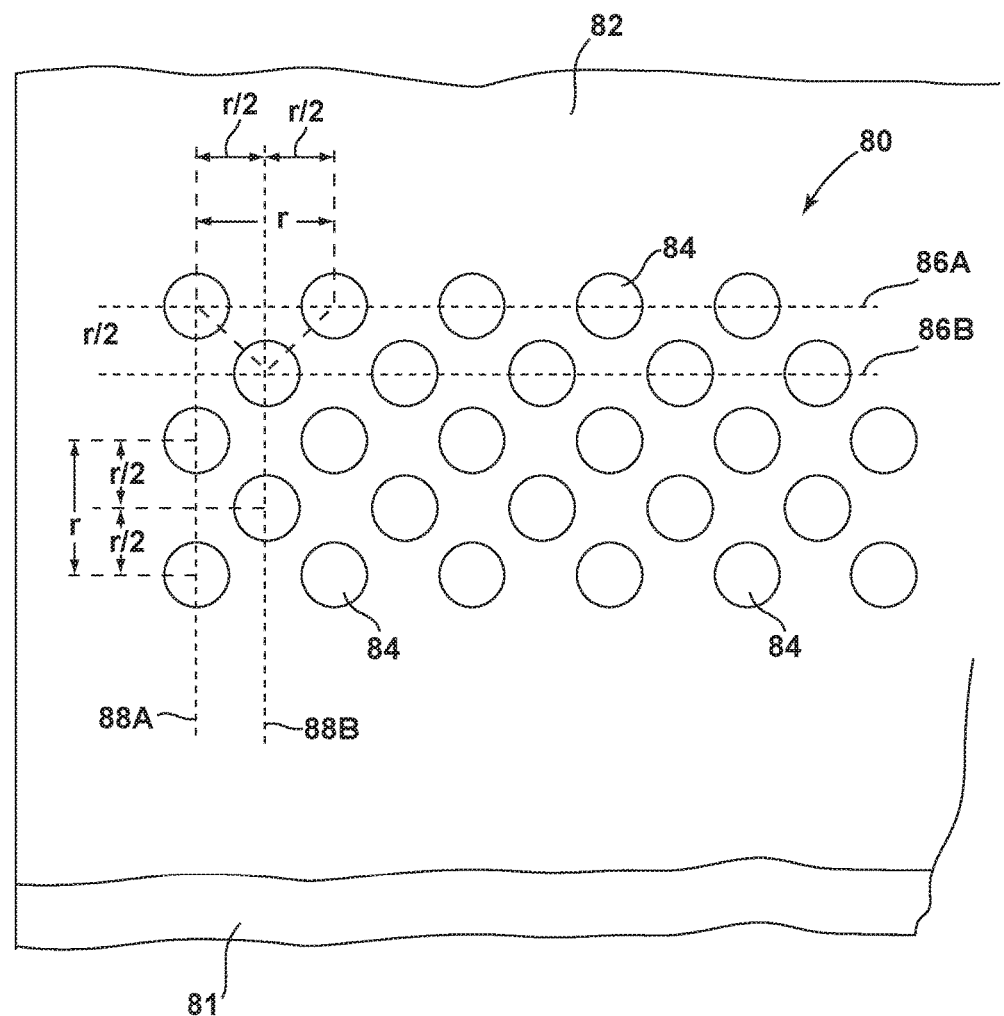
FIG. 3A is a schematic, overhead view of a pattern in a surface of a green ceramic article.

FIG. 3A is a schematic diagram of a non-limiting example embodiment of an array of surface features 80 that can be formed on at least a portion of a surface 82 of a green ceramic layer 81. The surface features may occupy all or a portion of the surface 82 of the coating 81. The array 80 includes a regular pattern of pocket-like depressions 84 that have shapes, sizes and patterns selected to, for example, control the porosity of the surface 82, or control flow of a fluid over the surface 82, while minimizing thermal stresses and stress concentrations in the coating 81. In the embodiment of FIG. 3A, the array 80 includes linear, parallel rows 86A, 86B and linear, parallel columns 88A, 88B of depressions 84. In rows 86A, 86B, the depressions 84 are a distance r apart, have a diameter x, and the depressions 84 of an adjacent row 86B are offset a distance r/2 relative to the depressions in the row 86A. In columns 88A, 88B, the depressions 84 are a distance r apart, and the depressions 84 of an adjacent column 88B are offset a distance r/2 relative to the depressions in the column 88A.

In various embodiments, the area of the individual depressions 84 should be sufficiently large, and the depressions should occupy a sufficiently large area of the surface 82, to resist thermal mismatches between opposed sides of the coating. This reduction in thermal mismatch can relieve thermal stresses within a hot surface of the coating, which in some embodiments can reduce coating spallation. Reduction in thermal mismatches can also allow a thicker coating to be applied on a substrate without resulting in excessive spallation and coating loss. In various embodiments, a thicker coating is desirable to increase maximum tip rub capability and provide enhanced thermal and/or environmental isolation.

In one embodiment, which is not intended to be limiting, the area occupied by the individual depressions 84 should be sufficiently small and occupy a sufficiently small area of the surface 82 to maintain or improve turbine performance by controlling flow across a tip of a rotating part that engages the coating. In some embodiments, the size of the depressions is small relative to the thickness of the tip of the rotating part that engages the coating, which can maintain or improve turbine performance by restricting the flow across the tip of the blade via a series of fluid expansions and/or contractions.

In some embodiments, which are not intended to be limiting, the depressions 84 can be aligned to create solid, unbroken ridges that extend from one side of a component to an opposite side thereof. Such unbroken ridges can allow a path for a fluid to travel across a tip of a rotating component that engages the coating 81 (such as, for example, a blade tip), which in some embodiments can diminish turbine efficiency. In addition, while not wishing to be bound by any theory, presently available evidence indicates that unbroken ridges in the surface 82 of the coating 81 can lower thermal stress compared to a solid abradable coating, but in some embodiments coatings with long unbroken ridges can still have a thermal mismatch between opposed sides.

In a presently preferred embodiment, the depressions 84 should be alternating and relatively close together as shown in FIG. 3A, which minimizes the number of straight, unbroken ridges in the coating 81. Again, while not wishing to be bound by any theory, presently available evidence indicates that alternating patterns of closely-spaced depressions 84 that create fewer straight, unbroken ridges in the surface 82 can more effectively relieve thermal strains in the coating 81. In addition, in some embodiments alternating patterns of depressions 84 can minimize fluid leakage between the rotating component and the coating 81.

The shapes, sizes, depths and patterning of the depressions 84 can vary widely depending on the intended application. In some embodiments, the shapes, sizes (e.g. diameters), depths and arrangement of the depressions 84 may be the same over all or a portion of the surface 82, which is referred to herein as a regular array. In other embodiments, at least one of the shapes, sizes, depths and arrangement of the depressions 84 differs over all or a portion of the surface 82, which is referred to herein as an irregular array. In some irregular arrays, the shapes, sizes, depths and arrangement of the depressions varies randomly over the surface 82, or particular types of depressions may be used in different areas of the surface 82. In the embodiment of FIG. 3A, the depressions 84 are hemispherically-shaped dimples similar to those found on the surface of a golf ball, although shapes such as pyramidal, conical, or portions of geodesic spheres made from triangular, tetrahedral, icosahedral or octahedral elements are possible.

Figure 3B:
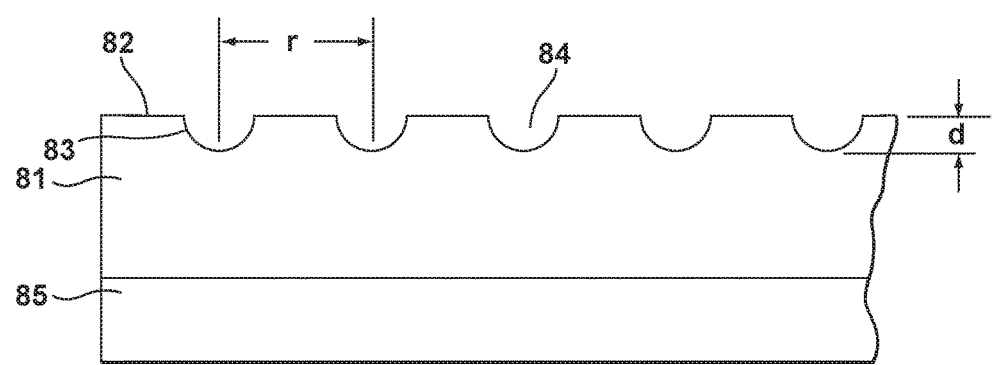
FIG. 3B is a schematic, cross-sectional view of the coating of FIG. 3A.

Referring to FIG. 3B, the cross-sectional profile 83 of the depressions 84 of FIG. 3A is semi-circular or parabolic, although other cross-sectional shapes are possible, such as square, rectangular, triangular or trapezoidal. Square or rectangular cross-sectional shapes create depressions with sharp sides and flat bottoms, which in some embodiments currently available evidence indicates would be less effective in minimizing thermal stresses in the coating 81, so depressions with gradually sloping sides are generally preferred. In some embodiments, depression shapes with sharp sides can also be more difficult to accurately and consistently manufacture at a reasonable cost.

To ensure performance and survivability of the coating 81, in some embodiments the depth d of the depressions 84 can be as deep as the maximum depth of the channel created when a rotating part (such as, for example, a turbine blade tip) engages the coating 81. In some embodiments the depressions 84 have a depth d extending all the way through the coating 81 to an underlying layer 85 on which the coating 81 is applied. In other embodiments the depth d of the depressions 84 should be less than the thickness of the coating 81 such that a solid area of the coating remains adjacent to the underlying layer 85 to act as a thermal and/or environmental barrier region. In various embodiments, the thickness of the abradable coating 81 is about 0.01 inches (0.25 mm) to about 0.125 inches (3.175 mm), and the depth d of the depressions 84 should not exceed the thickness of the abradable coating 81, but can be any thickness less than the thickness of the abradable coating 81.

In various embodiments that are merely included as examples are not intended to be limiting, a regular array of depressions that are each substantially spherical and have a depth d that that is the same as, or substantially similar to, their diameter x, have been found to be useful. For example, if x is the diameter of a depression at the surface of the abradable coating, and r is the spacing distance between adjacent depressions, (see FIG. 3A), in various embodiments the x/r ratio can be about 0.1 to about 1, or about 0.25 to about 0.75, or about 0.4 to about 0.7, or about 0.5 to about 0.67. In various embodiments that are not intended to be limiting, the diameter x of the depressions 84 is typically less than about 0.25 inches (6.35 mm).

Figure 3C:
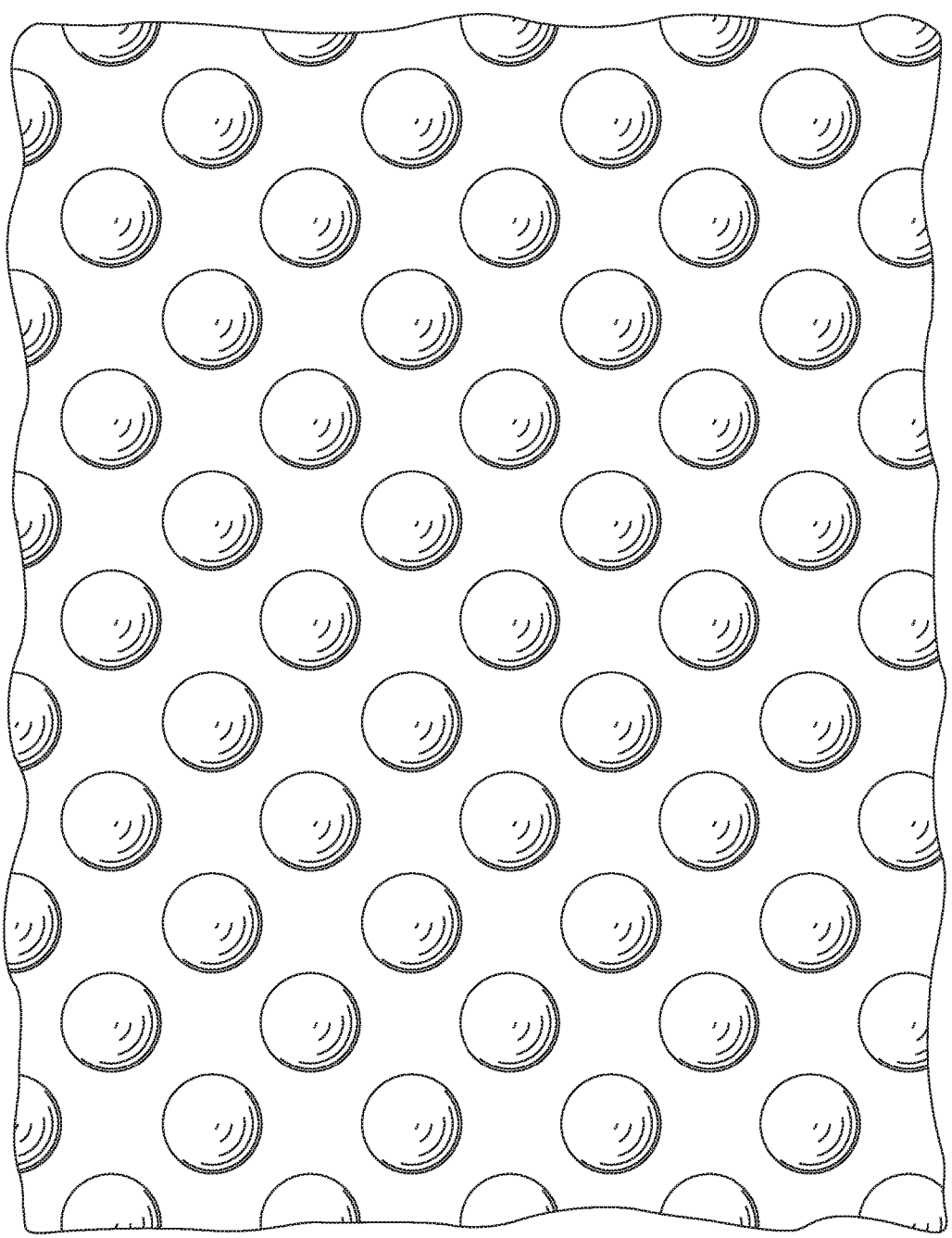
FIGS. 3C-3E are schematic, overhead views of patterns in a surface of a green ceramic article.
Figure 3D:
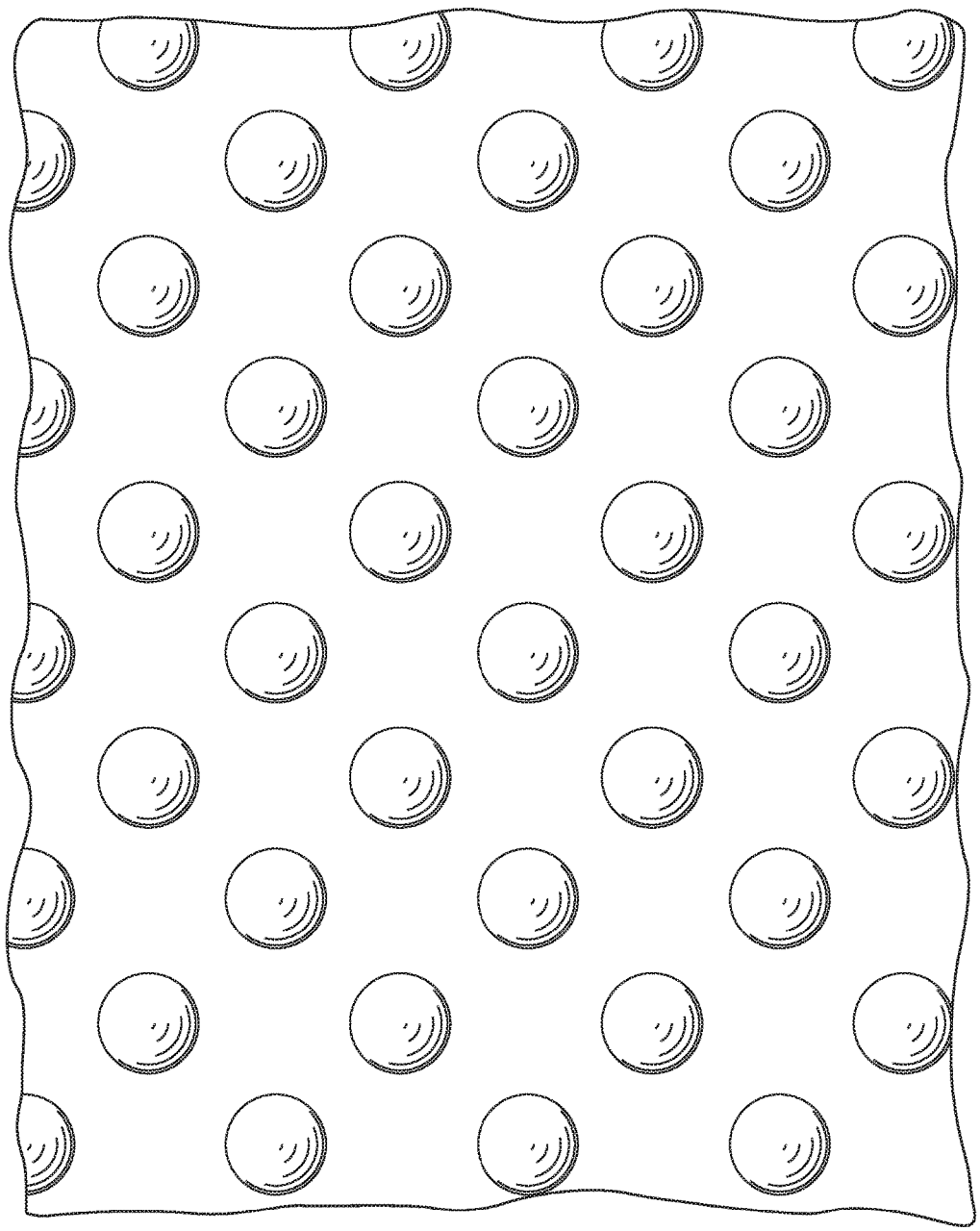
Figure 3E:
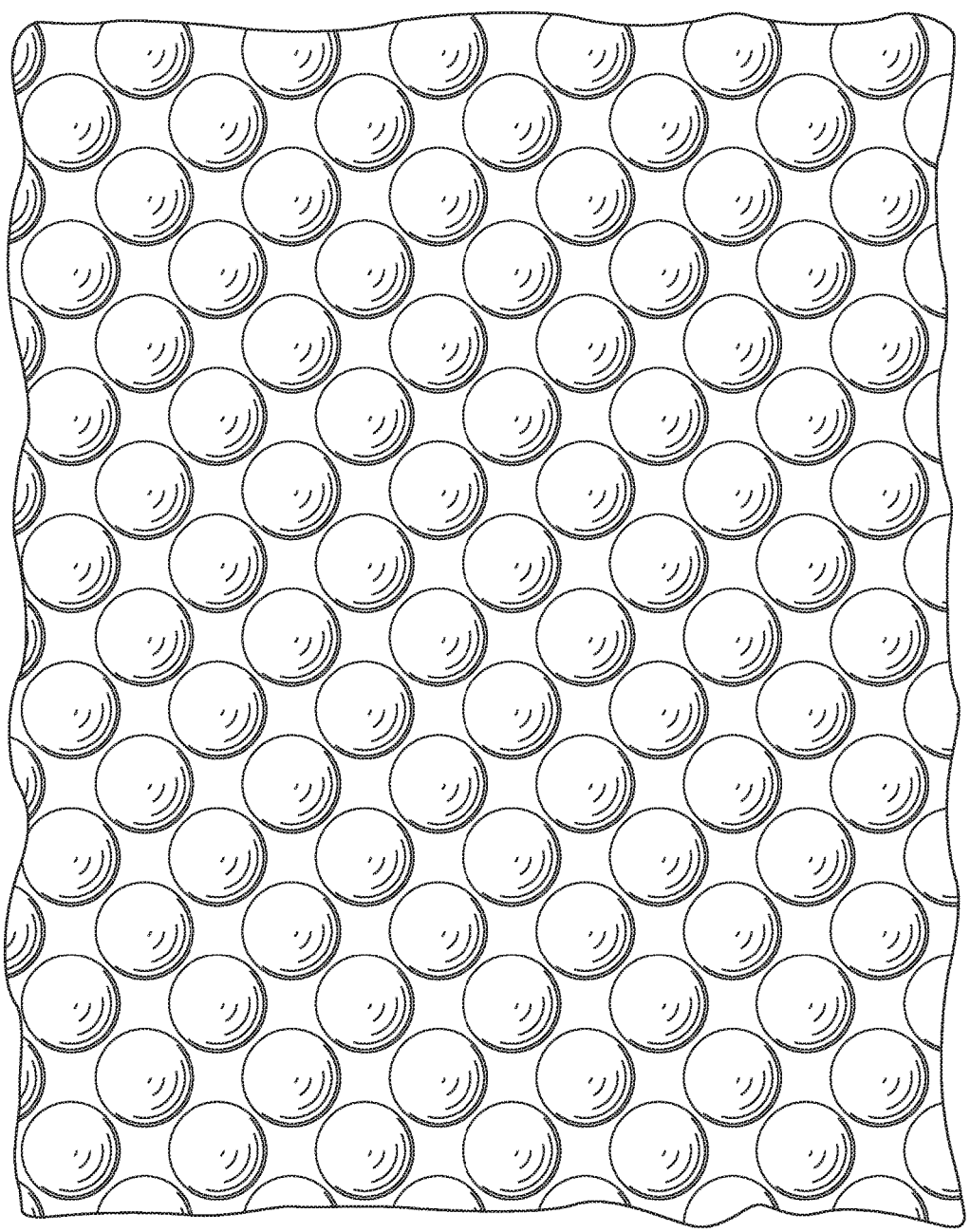

FIG. 3C shows a regular array of spherical depressions with an x/r ratio of about 0.5. At x/r ratios below 0.5, there are straight lines of surface material in four different directions. For example, FIG. 3D shows a regular array of spherical depressions with an x/r ratio of about 0.4. At x/r ratios of greater than about 0.5, there are only thin, straight lines of material along the surface in two directions (+/− 45°). FIG. 3E shows a regular array of spherical depressions with an x/r ratio of about 0.67. Ratios of x/r greater than about 0.67 have minimal distances between depressions, or the depressions begin to intersect.

As the x/r ratio increases, greater effective porosity is created in the abradable coating layer including the depressions. Again, as an example that is not intended to be limiting, if the depressions have a depth d that is approximately equal to their distance apart r, the effective coating porosity at an x/r ratio of 0.4 was about 17%, at an x/r ratio of 0.5 was about 26%, and at an x/r ratio of about 0.67 was about 47%. In various embodiments, suitable porosities can be about 5% to about 90%, or about 15% to about 80%, or about 25% to about 75%, or about 25% to about 50%, or about 25% to about 45% (all values are ±1%).

Figure 3F:
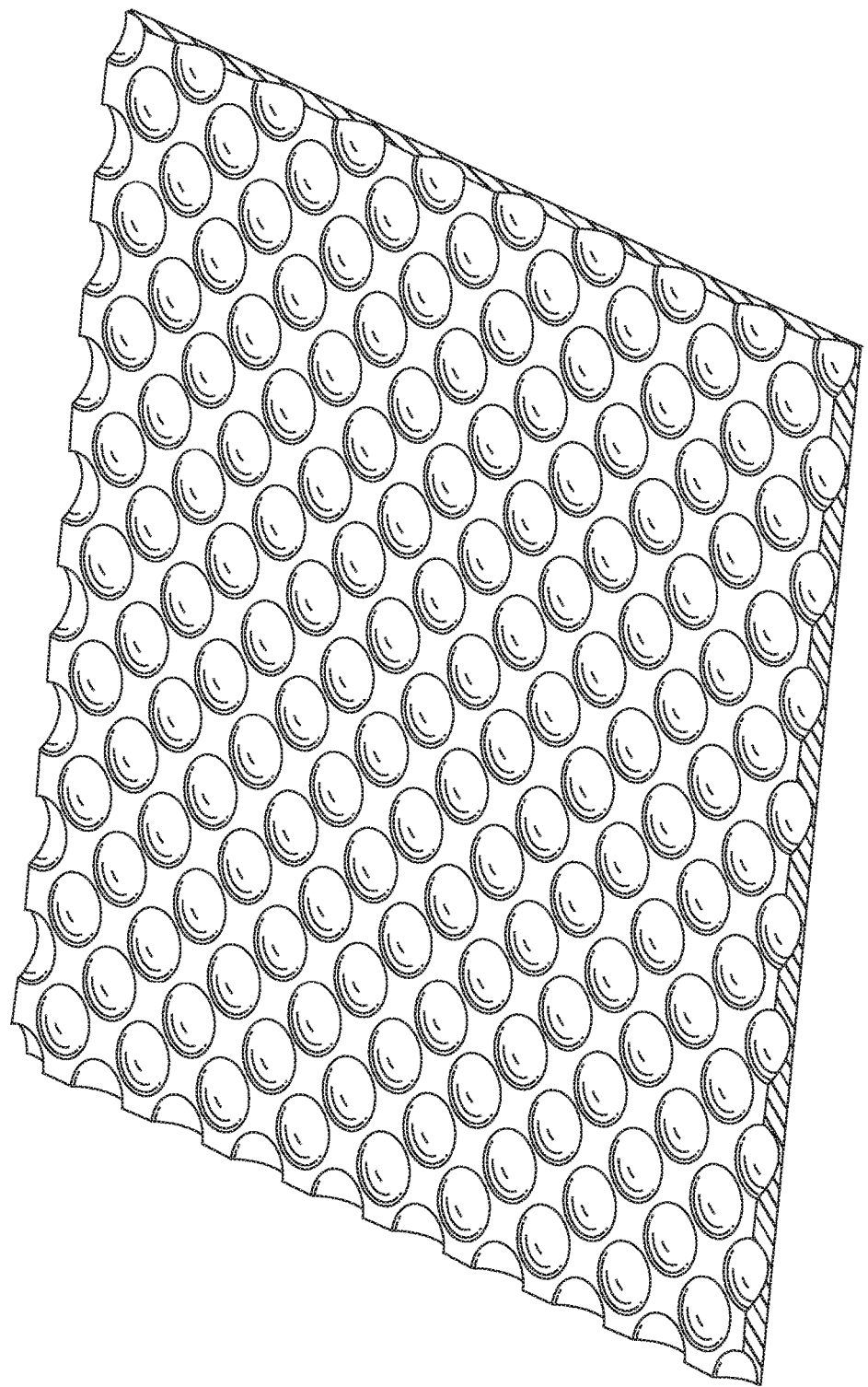
FIG. 3F is a schematic, plan view of a pattern in a portion of a surface of a green ceramic article.

Further, as shown in FIG. 3F, in some embodiments the array of depressions can extend all the way to an edge of a part, such that partial depressions remain near the edge. In some embodiments, this arrangement can further interrupt and/or eliminate the straight line of coating material at the edge.

In some embodiments, the surfaces including the depressions can optionally be treated (e.g., machined, polished, ground, cut, burnished, galled, drilled, or the like or a combination thereof) to achieve a desired dimension, surface morphology or chemistry.

The depressions 84 can be created in the surface 82 of the coating 81 by any suitable technique including, but not limited to, machining with a tool, laser sintering, water jet cutting, electrochemical machining (ECM), milling, and combinations thereof.

While the depressions 84 in FIGS. 3A-3F are generally spherically shaped dimples, a wide number of differently shaped depressions may be used.

Figure 4:
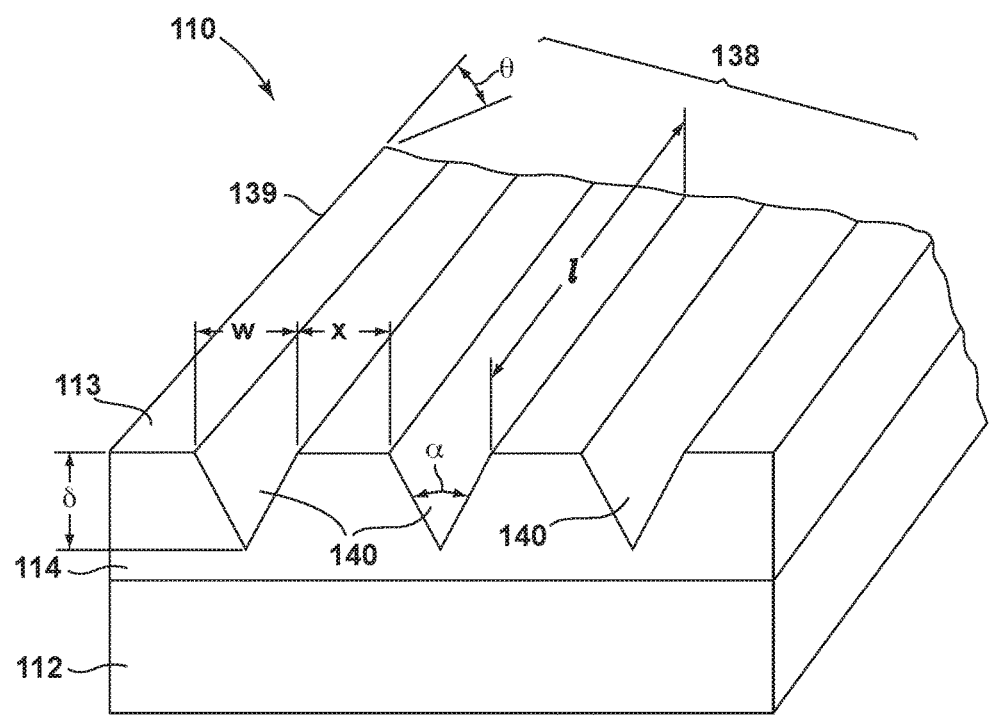
FIG. 4 is a schematic, cross-sectional view of a pattern of grooves in a surface of a green ceramic article.

In another embodiment shown schematically in FIG. 4, the tool 130 and the green ceramic article 110 could be moved with respect to one another along the direction of the arrow B in FIG. 2 to create a pattern or array 138 of V-grooved channels 140 in all or a portion of the surface 113. In various embodiments, the grooves 140 could have a depth δ of about 0.01 inches (0.25 mm) to about 0.125 inches (3.175 mm), a width w of about 0.01 inches (0.25 mm) to about 0.125 inches (3.175 mm), a spacing x of about 0.01 inches (0.25 mm) to about 0.25 inch (6.35 mm), and any length l up to the entire length of the component. The angle α of the grooves 140 is generally less than about 135°. The grooves 140 can be oriented parallel to an edge 139 of the tape construction 110, or can be oriented at an angle θ with respect to the edge 139, with θ ranging from about 0° to about 90°. The channels 140 could be straight as shown in FIG. 3, or in some embodiments could be curved or resemble wavy lines.

However, FIG. 2 is just one example of tooling that could be used to machine the surface 113 of the green ceramic layer 114, and other examples of suitable machining techniques include, but are not limited to, patterned rollers, laser sintering, water jet cutting, electrochemical machining (ECM), and combinations thereof.

Figure 5:
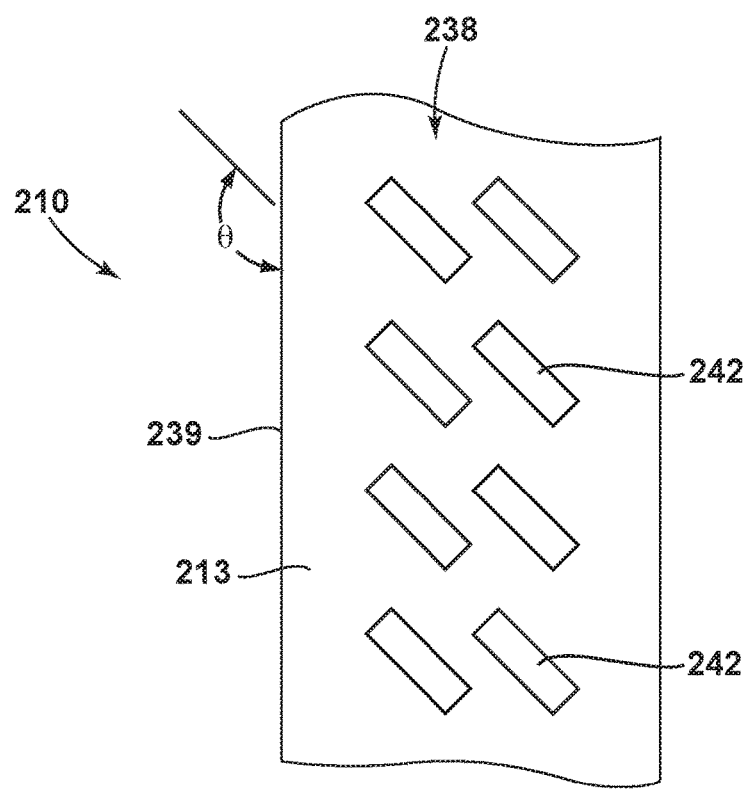
FIGS. 5-9 are schematic, overhead views of patterns of blocks in a surface of a green ceramic article.

In various embodiments, which are not intended to be limiting, the tool 130 could be utilized to create any type or combination of patterns in the surface 113 that could stop, redirect or otherwise control fluid flow adjacent the surface 113, or adjust the porosity of the surface 113. The pattern in the surface 113 of the green ceramic layer 114 can be continuous or discontinuous, regular or irregular, and can occupy all or a portion of the surface. For example, as shown schematically in FIG. 5, the pattern 238 in all or a portion of a surface 213 of a machined green ceramic article 210 can include staggered, spaced-apart block-like regions 242, and the blocks 242 can be oriented at an angle θ with respect to an edge 239.

Figure 6:
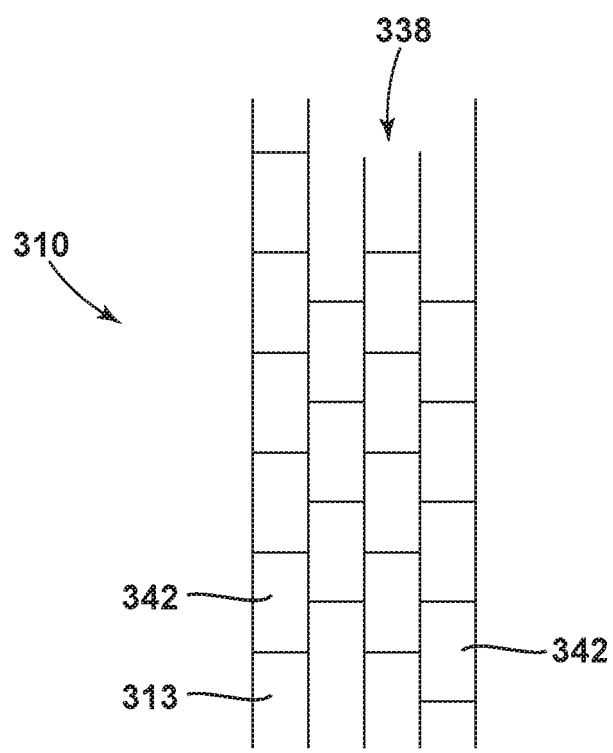

In another example shown in FIG. 6, the pattern 338 in the in all or a portion of a surface 313 of a machined green ceramic article 310 can include densely spaced, staggered block-like regions 342.

Figure 7:
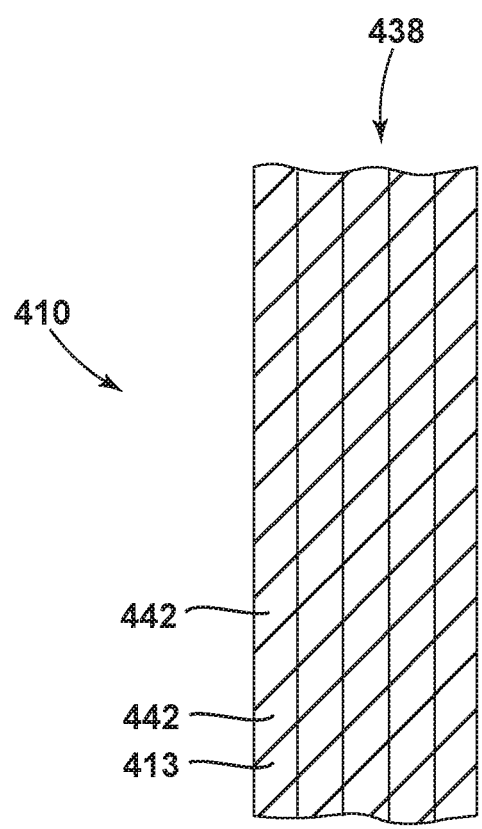

In yet another example shown in FIG. 7, the pattern 438 in the in all or a portion of a surface 413 of a machined green ceramic article 410 can include diamond-shaped blocks 442.

Figure 8:
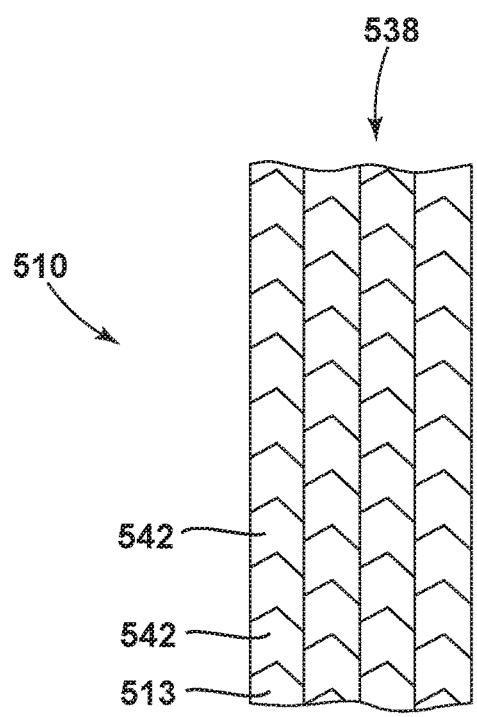

In yet another example shown in FIG. 8, the pattern 538 in the in all or a portion of a surface 513 of a machined green ceramic article 510 can include chevron-shaped blocks 542.

Figure 9:
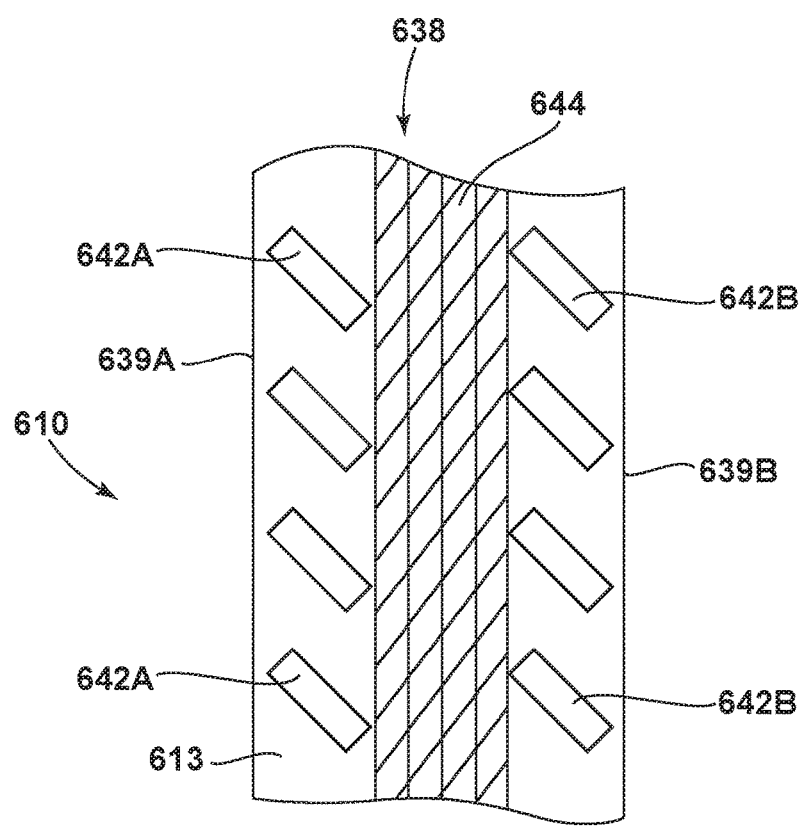

Many other patterns are possible, including honeycomb-like patterns and the like. Combinations of patterns can also be used. For example, in one embodiment shown in FIG. 9, the pattern 638 in the in all or a portion of a surface 613 of a machined green ceramic article 610 can include a first arrangement of blocks 642A-642B along respective edges 639A-639B, and an arrangement of diamond-shaped blocks 644 between the blocks 642A-642B.

In each of the patterns shown in FIGS. 2-9, the surface features can protrude upward from the surface of the green ceramic layer to a height of about 0.01 inches (0.25 mm) to about 0.125 inches (3.175 mm), or can be depressed into the surface of the green ceramic layer at a depth of about 0.01 inches (0.25 mm) to about 0.125 inches (3.175 mm).

After the green ceramic layer is machined, the machined green ceramic article may be cut to size and selectively applied to a surface of a metal or CMC part to form a laminate.

The machined green ceramic article may optionally be treated to enhance bonding or lamination to the surface of the metal or CMC part, or to maintain the flexibility of the green ceramic layer during the bonding process. For example, in some embodiments the green ceramic layer may be at least partially dried, or the machined green ceramic article may be heated to enhance the tackiness of the machined green ceramic layer and improve adherence to a selected substrate material. In some embodiments, this heating step may be performed in a closed chamber such as an autoclave, and the atmosphere within the autoclave may contain a solvent selected to enhance or maintain properties of the machined green ceramic layer during the bonding or lamination step such as, flexibility, tackiness and the like. Once the machined green ceramic layer becomes sufficiently tacky for lamination to the surface of a part, any backing layers or support layers may optionally be removed. The machined green ceramic layer can then be applied to the surface of the part and undergo subsequent treatment steps.

Figure 10:
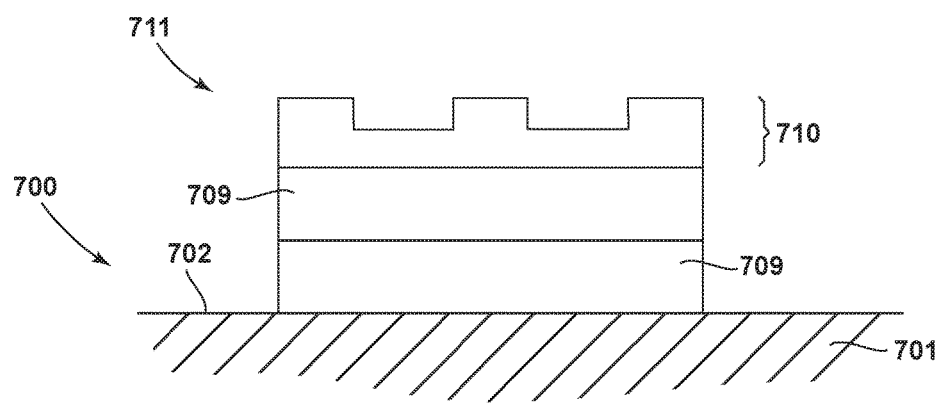
FIGS. 10-11 are schematic, cross-sectional view of laminates including a machined green ceramic article.

Referring to FIG. 10, in one example embodiment a laminate 700 includes a green ceramic matrix composite (CMC) part 701 with a surface 702. The CMC part 701 may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave. The filler composition, shape, size, and the like may be selected to provide the desired properties to the CMC. For example, the filler material may be chosen to increase the toughness of a brittle ceramic matrix. The filler may also be chosen to modify a thermal conductivity, electrical conductivity, thermal expansion coefficient, hardness, or the like of the CMC. In some embodiments, the filler composition may be the same as the ceramic matrix material. For example, a silicon carbide matrix may surround silicon carbide whiskers. In other embodiments, the filler material may include a different composition than the ceramic matrix, such as aluminum silicate fibers in an alumina matrix, or the like. One preferred CMC includes silicon carbide continuous fibers embedded in a silicon carbide matrix.

Some example ceramics and CMCs which may be used include ceramics containing Si, such as SiC and $Si_3N_4$; composites of SiC or $Si_3N_4$ and silicon oxynitride or silicon aluminum oxynitride; metal alloys that include Si, such as a molybdenum-silicon alloy (e.g., $MoSi_2$) or niobium-silicon alloys (e.g., $NbSi_2$); and oxide-oxide ceramics, such as an alumina or aluminosilicate matrix with a ceramic oxide fiber such as those available from 3M Co., St. Paul, Minn., under the trade designation NEXTEL 720.

A machined green ceramic article 710 can be applied directly on the surface 702 of the green CMC part 701, or may optionally be laid-up over at least one additional green ceramic layer 709, which optionally may also be machined to include any of the patterns described herein.

In some embodiments, the resulting laminate 711 is then heated to about 100° C. to about 200° C., and pressure of about 800 psi to about 1000 psi to bond the laminate 711 to the surface 702 of the CMC part 701. The temperature and pressure selected for the lamination step may vary widely depending on the inter-laminar strength desired.

Following the lamination step, a molten metal alloy infiltrant is applied to the green CMC part 701. The molten metal alloy wicks between the ceramic particles in the green CMC article and occupies the interstices between the particles until the green CMC article is fully densified to less than about 5%, or less than about 3%, or less than about 1%, porosity to form a composite article. In various embodiments, the alloy infiltrant includes Si, B, Al, Y, Ti, Zi, oxides thereof, and mixtures and combinations thereof.

In various embodiments, the temperature for metal alloy infiltration such as for example, Si, is about 1400° C. to about 1500° C., which in some embodiments can cause decomposition and substantially complete or partial removal of the binder, solvent, and additives in the machined green ceramic layer to sinter the green ceramic layer and form a machined ceramic overlay coating. The duration of the infiltration can be between about 15 minutes and 4 hours, or about 60 minutes to about 20 minutes. The infiltration process can optionally be carried out under vacuum, but in other embodiments can be carried out in inert gas under atmospheric pressure to limit evaporation losses.

After infiltration is complete, the resulting patterned abradable overlay coating may optionally be further machined to modify the pattern thereon.

Figure 11:
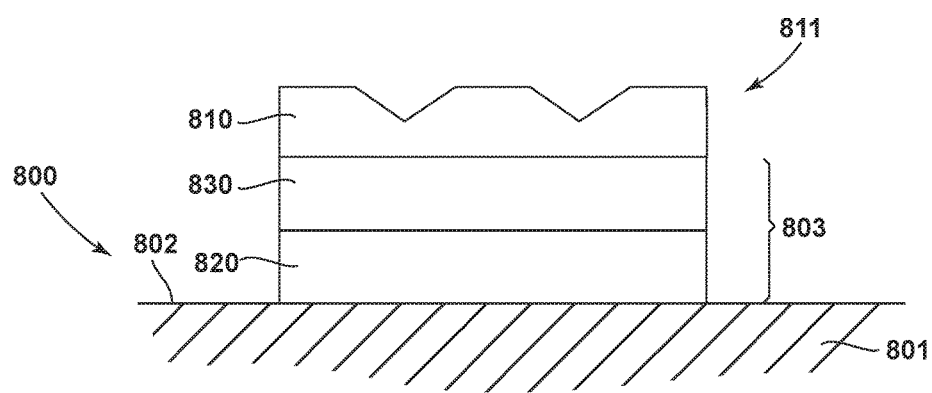

In another embodiment shown in FIG. 11, a laminate construction 800 includes a metal or CMC part 801 with a surface 802. A machined green ceramic article 810 is laid-up over an interface coating 803 on the surface 802. The interface coating 803 may include a single layer or multiple layers of the same or different materials.

In various embodiments, the individual layers of the interface coating 803 can have a thickness of about 0.00001 inches to about 0.025 inches (about 0.00025 mm to about 0.635 mm). The layers of interface coating 803 can be applied or coated onto the surface 802 by any suitable process such as, for example, direct vapor deposition (DVD), electron-beam physical vapor deposition (EBPVD), plasma spraying (e.g., atmospheric plasma spraying, or APS), chemical vapor deposition (CVD), and combinations thereof.

Referring again to FIG. 11, the interface coating 803 includes a bond coating 820 on the surface 802. In various embodiments, the bond coating 820 can include single or multiple layers and has a thickness of about 0.001 inches to about 0.010 inches (about 0.025 mm to 0.254 mm). In various embodiments, the bond coating 820 may include mullite (aluminum silicate, $Al_6Si_2O_{13}$), silica, silicides, silicon, or the like. The bond coating 820 may further include other ceramics, such as rare earth silicates including silicates of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium). In some embodiments, the bond coating for depositing over the CMC substrate includes silicon, mullite, and ytterbium silicate, and in some embodiments consists of Si.

Referring to FIG. 11, an outer coating 830 may be formed on all or a part of the interface coating 803. The outer coating 830 can include components such as an environmental barrier coating, a thermal barrier coating, or a combination thereof. In some embodiments, a bilayer or multilayer coating may provide thermal protection and resistance to oxidation, water vapor attack, or the like. In some embodiments, the thermal barrier coating may be deposited over the environmental barrier coating, while in other embodiments, the environmental barrier coating may be deposited over the thermal barrier coating.

Suitable examples of outer coatings include environmental barrier coatings such as, for example, mullite; glass ceramics such as barium strontium alumina silicate ($BaO_x$—$SrO_{1-x}$—$Al_2O_3$-$2SiO_2$; BSAS), barium alumina silicate (BaO—$Al_2O_3$-$2SiO_2$; BAS), calcium alumina silicate (CaO—$Al_2O_3$-$2SiO_2$), strontium alumina silicate (SrO—$Al_2O_3$-$2SiO_2$; SAS), lithium alumina silicate ($Li_2O$—$Al_2O_3$-$2SiO_2$; LAS) and magnesium alumina silicate ($2MgO$-$2Al_2O_3$-$5SiO_2$; MAS); rare earth silicates and the like.

Suitable examples of thermal barrier coatings, which may provide thermal insulation to the CMC substrate to lower the temperature experienced by the substrate, include, but are not limited to, insulative materials such as ceramic layers with zirconia or hafnia. The thermal barrier coating may optionally include other elements or compounds to modify a desired characteristic of the coating, such as, for example, phase stability, thermal conductivity, or the like. Exemplary additive elements or compounds include, for example, rare earth oxides.

In some embodiments, the surfaces of one or more of the layers of any of the interface coating 803 described in FIG. 11 can be treated (e.g., machined, polished, ground, cut, burnished, galled, drilled, or the like or a combination thereof) to achieve a desired dimension, surface morphology or chemistry prior to formation of the laminate 811. For example, one or more of the layers of any of the interface coating systems described above may be machined to vary the thickness thereof or to introduce surface features (e.g., grooves, mesas, dimples, apertures, asperities, or the like or a combination thereof). In one embodiment, one or more of the layers of any of the interface coating systems described in FIG. 10 can be treated to blend the edges thereof into the surface of the part 801.

The laminate 811 can optionally be heated to about 100° C. to about 200° C., and pressure of about 800 psi to about 1000 psi applied, to bond the laminate 811 to the surface 802 of the part 801. The temperature and pressure selected for the lamination step may vary widely depending on the inter-laminar strength desired.

The laminate 811 may then be sintered using well known techniques to harden the machined ceramic layer 810 and any of the layers of the interface coating system 803 to form a patterned abradable overlay coating.

The resulting patterned abradable overlay coating may optionally be further machined to modify the pattern thereon.

The patterned abradable coatings and coating overlays of the present disclosure can be used on any type of turbine engine components, but shrouded and un-shrouded. In these applications, the patterned abradable overlay coating may produce any or all of the following effects: reduce swirling of the fluid over the surface, modify the direction of flow to enhance aerodynamic efficiency, control leakage flow, modify the porosity of the coating, and the like.

Figure 12:
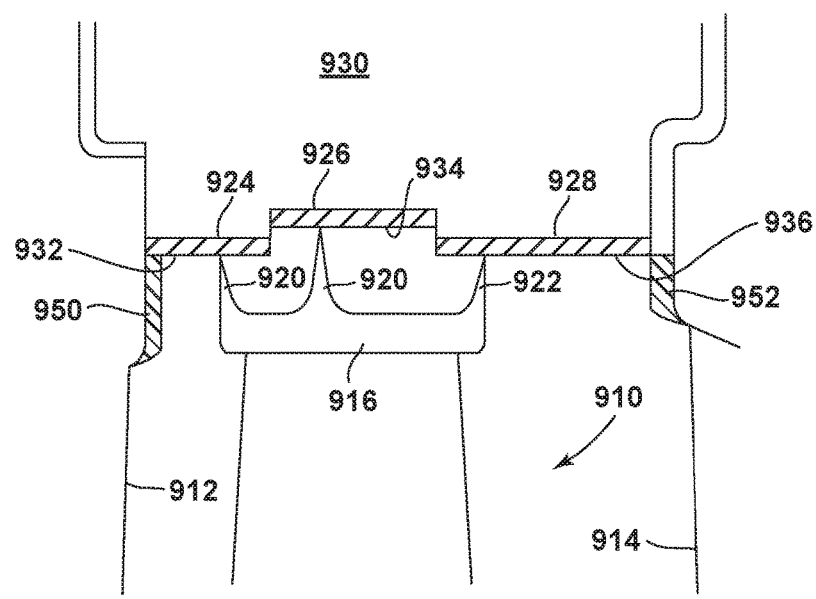
FIG. 12 is a schematic, partial side view of a rotating turbine engine component and an adjacent stationary component.

FIG. 12 provides a non-limiting example a patterned abradable overlay coating applied on a surface of a stationary turbine engine part adjacent to a rotatable turbine engine part to control fluid flow over the surface of the stationary part. In the non-limiting example of FIG. 12, a shrouded bucket 910 is mounted on a rotor wheel axially between a pair of upstream and downstream nozzle vanes 912, 914. The shrouded bucket 910 includes a tip shroud 916 formed with radially projecting axially spaced teeth 918, 920, 922. The teeth 918, 920, 922 are arranged to interact with machined ceramic overlays 924, 926, 928 on a surrounding stator shroud 930. The overlays 924, 926, 928 form abradable coating seals that may be applied to respective surfaces 932, 934, 936 of the stator shroud 930 to modify fluid flow over the surfaces 932, 934, 936. As another example, abradable ceramic overlays 950, 952 may be applied on the nozzle vanes 912, 914.

Various embodiments of the invention have been described. These and other embodiments are within the scope of the following claims.

The invention claimed is:

1. A ceramic article, comprising a flexible backing layer selected from paper, woven fabric, non-woven fabric, polymeric films, metal foils, and combinations thereof; and a green ceramic layer on a first side of the flexible backing, wherein the green ceramic layer is a separate and distinct layer from the flexible backing layer, wherein the green ceramic layer comprises a ceramic material and a polymeric binder, wherein a major surface of the green ceramic layer defines a pattern of surface features, wherein the green ceramic layer defines a layer thickness of greater than about 0.25 millimeters (mm), and wherein the flexible backing layer is releasable from the green ceramic layer, and wherein the ceramic material comprises silicates selected from the group consisting of rare earth (RE) disilicates, RE monosilicates, barium strontium aluminum silicate, and mixtures and combinations thereof.

2. The ceramic article of claim 1, where the flexible backing layer comprises a polymeric film.

3. The ceramic article of claim 1, wherein the polymeric binder in the green ceramic layer comprises polyvinyl butyral.

4. The ceramic article of claim 1, wherein the green ceramic layer further comprises a solvent selected from the group consisting of alcohols, acetone, and methyl ethyl ketone (MEK), and mixtures and combinations thereof.

5. The ceramic article of claim 1, further comprising a support layer on a second side of the flexible backing layer opposite the first side.

6. The ceramic article of claim 1, further comprising a release liner on the major surface of the green ceramic layer and overlying the pattern.

7. The ceramic article of claim 1, wherein the pattern of surface features comprises an array of grooves, an array of blocks, an array of apertures, a honeycomb pattern, or a combination thereof.

8. The ceramic article of claim 1, wherein the pattern of surface features comprise hemispherically-shaped depressions.

9. The ceramic article of claim 8, wherein the hemispherically-shaped depressions are arranged in a plurality of rows on the major surface of the green ceramic layer, wherein the hemispherically-shaped depressions within a respective row of the plurality of rows are offset with respect to the hemispherically-shaped depressions within an adjacent row.

10. The ceramic article of claim 9, wherein the plurality of rows comprise a first row and a second row adjacent to the first row, wherein the hemispherically-shaped depressions in the first row are a distance (r) apart measured in a direction of the first row, wherein the hemispherically-shaped depressions in the second row are a distance (r) apart measured in the direction of the first row, and wherein the hemispherically-shaped depressions in the second row are offset with respect to the hemispherically-shaped depressions in the first row by a distance (r/2) measured in the direction of the first row.

11. The ceramic article of claim 9, wherein the hemispherically-shaped depressions in a respective row of the plurality or rows are a distance (r) apart measured in a direction of the respective row, and wherein the ratio of a diameter of the hemispherically-shaped depressions (x) to the distance (r) is about 0.25 to about 0.75.

12. The ceramic article of claim 8, wherein the hemispherically-shaped depressions are selected and arranged on the major surface to provide the green ceramic layer with a porosity of about 25% to about 75%.

13. The ceramic article of claim 1, wherein the green ceramic layer has a porosity of about 25% to about 50%.

14. A method, comprising:
  forming a slurry comprising a ceramic material, a polymeric binder, and at least one solvent;
  coating the slurry on a flexible backing layer to form a green ceramic layer with a disperse phase of the ceramic material in a matrix of the polymeric binder, wherein the green ceramic layer defines a layer thickness of greater than about 0.25 millimeters (mm), wherein the green ceramic layer is a separate and distinct layer from the flexible backing layer, and wherein the flexible backing layer is releasable from the green ceramic layer, and
  machining a pattern of surface features into a major surface of the green ceramic layer to form a machined green ceramic article, wherein the ceramic material comprises silicates selected from the group consisting of rare earth (RE) disilicates, RE monosilicates, barium strontium aluminum silicate, and mixtures and combinations thereof.

15. The method of claim 14, further comprising drying the slurry after coating the slurry on the flexible backing layer.

16. The method of claim 14, wherein the flexible backing layer comprises a polymeric film.

17. The method of claim 14, wherein the polymeric binder comprises polyvinyl butyral.

* * * * *